United States Patent [19]
Lindahl

[11] Patent Number: 5,655,299
[45] Date of Patent: Aug. 12, 1997

[54] METHOD OF FABRICATING A TANK AND METHOD OF FABRICATING A TANK CONNECTOR THEREFOR

[75] Inventor: D. Kent Lindahl, Pleasant View, Tenn.

[73] Assignee: State Industries, Inc., Ashland City, Tenn.

[21] Appl. No.: 472,438

[22] Filed: Jun. 7, 1995

[51] Int. Cl.⁶ .............................. B23P 11/02; B65D 25/38; F16L 21/02; F22B 37/02

[52] U.S. Cl. .................. 29/890.051; 29/460; 29/522.1; 29/890.145; 220/4.12; 220/465; 264/512; 285/286.2; 285/382.4

[58] Field of Search .................... 29/460, 522.1, 29/523, 890.03, 890.051, 890.14, 890.145; 220/4.06, 4.12, 465, 661; 228/184; 264/512; 285/109, 130, 286, 382.4

[56] References Cited

U.S. PATENT DOCUMENTS

| | | | |
|---|---|---|---|
| 1,457,753 | 6/1923 | Schmitt | 29/890.145 X |
| 4,887,853 | 12/1989 | Flowers et al. | 29/523 X |
| 4,964,205 | 10/1990 | Coffman | 264/512 X |
| 5,158,200 | 10/1992 | Vago et al. | 220/465 |
| 5,217,140 | 6/1993 | Lindahl | 220/4.12 X |

FOREIGN PATENT DOCUMENTS

| | | | |
|---|---|---|---|
| 407586 | 3/1934 | United Kingdom | 29/523 |
| 598971 | 3/1948 | United Kingdom | 29/460 |
| 705437 | 3/1954 | United Kingdom | 29/890.145 |
| 2024973 | 1/1980 | United Kingdom | 29/523 |

*Primary Examiner*—Peter Vo
*Attorney, Agent, or Firm*—Paul R. Puerner

[57] ABSTRACT

The method of fabricating a tank connector assembly comprising the steps of first providing a metal spud member having an internally threaded portion and a cylindrical wall portion. Producing a sub-assembly comprised of an insert member having an internal groove therein and made from a polymer material and an expandable band member positioned in the groove. The next step is to assembly the sub-assembly of the insert member and expandable band member with the spud member. The sub-assembly is positioned inside the cylindrical wall portion of the spud member. The next step is to apply an expansion force to the expandable band causing the band to deform slightly and thereby force the insert member into tight sealing contact with the depending wall portion of the spud member. The metal spud member is welded in an opening in the wall of a steel tank. A polymer material is introduced into the interior of the steel tank and the tank is then subjected to a rotational casting movement in the presence of heat to cause the polymer material in the tank to be uniformly distributed over the internal surface of the tank. The heat applied during the rotational casting step serves to cause the inner tank to become bonded to the insert member.

14 Claims, 5 Drawing Sheets

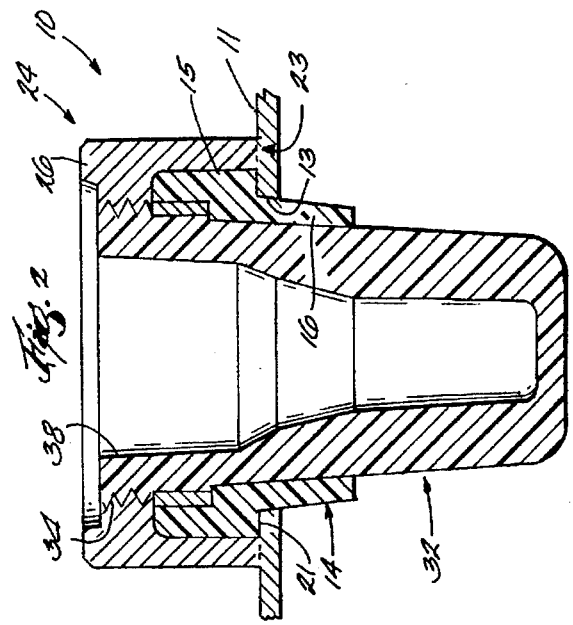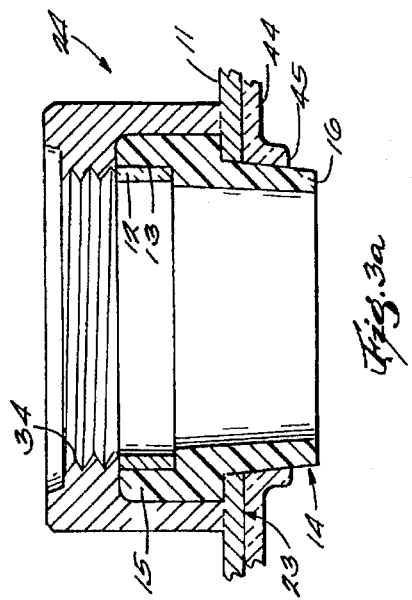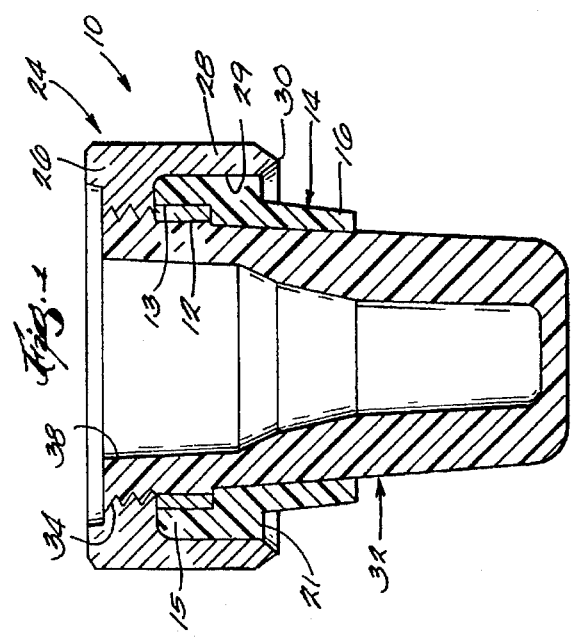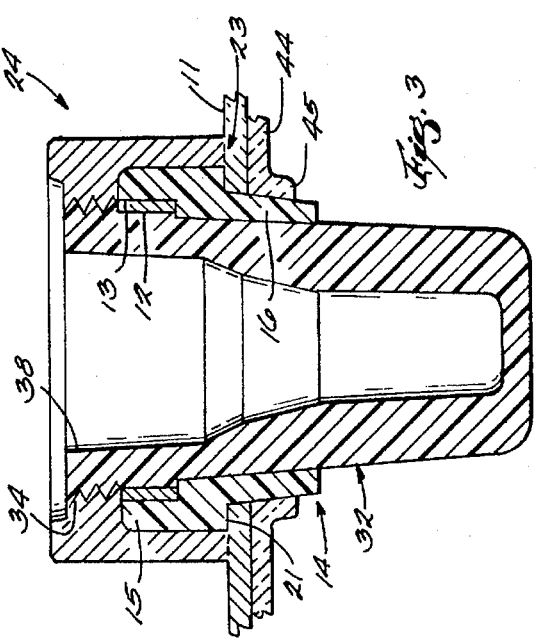

5,655,299

METHOD OF FABRICATING A TANK AND METHOD OF FABRICATING A TANK CONNECTOR THEREFOR

BACKGROUND OF THE INVENTION

The background of the invention is set forth hereafter under the heading "Description of the Prior Art".

SUMMARY OF THE INVENTION

The method of fabricating a tank connector assembly comprising the steps of first providing a metal spud member having an internally threaded portion and a cylindrical wall portion: Mounting an insert member of polymer material inside a cylindrical wall portion of the spud member, the insert member having a cylindrical wall portion. Positioning an expandable ring member in a groove in the interior face of the cylindrical wall of the insert member. An expandable force is applied to the ring member causing the ring member to deform slightly and thereby force the insert member into tight sealing contact with the spud member.

BRIEF DESCRIPTION OF THE DRAWINGS

FIG. 2 is a section view of the connector assembly of FIG. 1 after the assembly has been welded in an opening in a tank wall;

FIG. 3 is a sectional view of the connector assembly of FIG. 2 after an inner shell of polymer material has been formed inside the outer tank wall;

FIG. 3a is a sectional view of the connector assembly of FIG. 3 after the plug member has been removed from the spud;

FIG. 4 is a sectional view of a second embodiment of a connector assembly made in accordance with the present invention;

FIG. 9 is a perspective view of the two parts of the outer shell of the tank prior to the assembly of such parts into the completed shell;

FIG. 10 is a perspective view of the outer shell of the tank with the two parts fastened together;

FIG. 11 is a partially schematic view of the outer shell of the tank when subjected to rotational movement;

FIG. 12 is a side elevational view of the completed tank with a part of the outer and inner shells broken away; and FIG. 13 is an enlarged fragmentary view of the area 19 of FIG. 12.

RELATED APPLICATION

Figure 1:
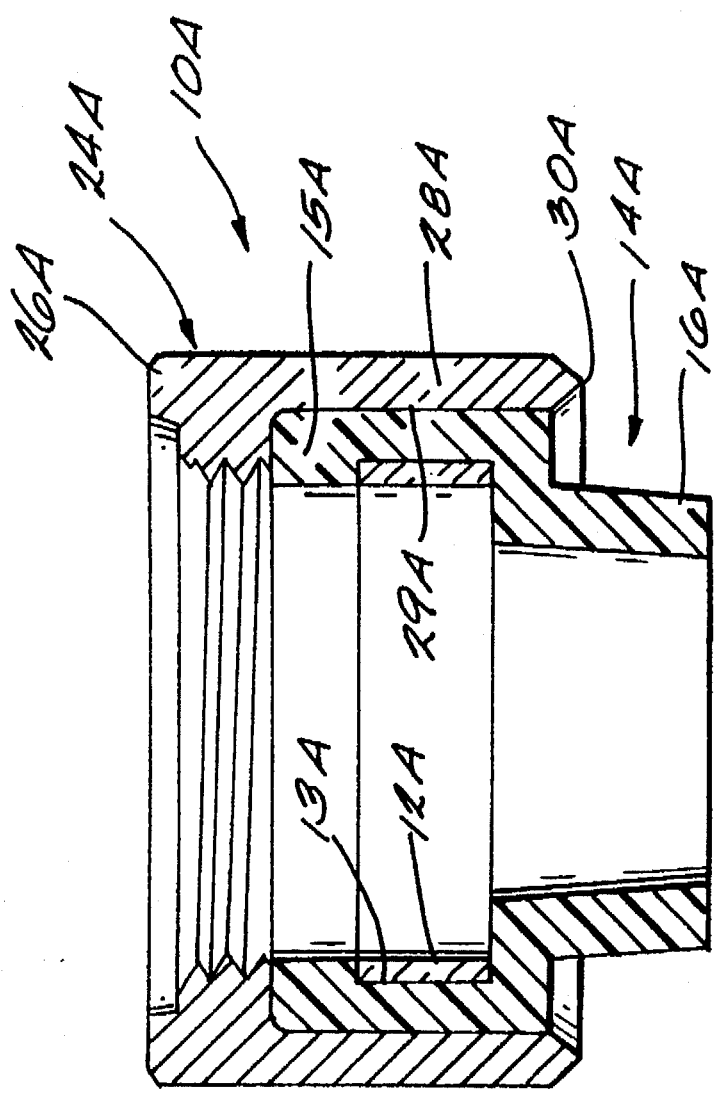
FIG. 1 is a sectional view of a connector assembly made in accordance with the present invention.

An application directed to the product made by the method of the present application is identified by Ser. No. 465,671 filed on Jun. 7, 1995, now U.S. Pat. No. 5,509,567 which related application being assigned to the assignee of the present application.

DESCRIPTION OF THE PREFERRED EMBODIMENT

The tank connector fitting construction of the present invention is specifically designed for use in a tank comprised of an outer shell of metal material and an inner shell of non-corrosive and non-metallic polymer material. More specifically, the preferred embodiment of the present invention is designed for installation in a tank construction shown and described in U.S. Pat. No. 5,217,140 issued Jun. 8, 1993 and assigned to the assignee of this application and incorporated herein by reference.

Description of the Prior Art

Prior tank connector fittings for use in the tank construction shown in U.S. Pat. No. 5,217,140 are shown and described in U.S. Pat. No. 5,158,200 dated Oct. 27, 1992 and assigned to the assignee of this application. An example of such a prior art tank connector construction is as follows.

Referring to FIGS. 5–8, FIG. 5 shows a tank connection comprised of an outer tank shell 370 of metal and a metal connector fitting 372 welded to shell 370 at weld areas 374. Fitting 372 has an internal threaded body portion 376 and an internal groove 378. A sleeve 380 having a cylindrical body portion 382 and a radially extending flange portion 384 is mounted in groove 378 of fitting 372. Body portion 382 and flange 384 have a continuous smooth tapered internal surface 385. Sleeve 380 is made of a polymer material. The body portion 382 of sleeve 380 extends through an opening 386 in shell 370.

Figure 5:
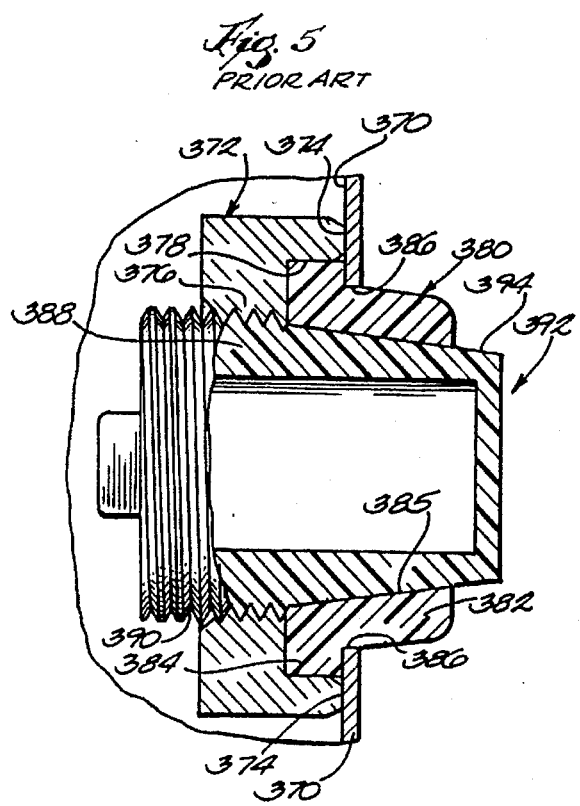
FIGS. 5-8 show a prior art tank connector reproduced from U.S. Pat. No. 5,158,200.

A plug member 388 is threaded into fitting 372 and extends through sleeve 380 as shown in FIG. 5. Plug member 388 is preferably made of a material having a low thermal conductivity such as fluoroplastics. Plug member 388 is comprised of an externally threaded body portion 390 and an end portion 392 having a smooth external tapered surface 394. With the plug 388 installed as shown in FIG. 5, the threaded portion 390 extends only to the groove 378 in fitting 372 and the tapered surface 394 on the plug fits snugly in the tapered internal surface 385 of sleeve 380.

Figure 6:
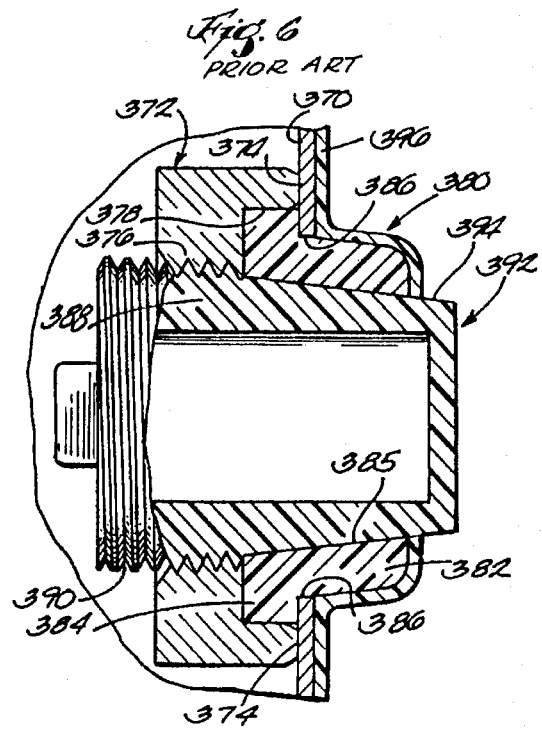

FIG. 6 shows the assembly of FIG. 5 after an inner shell 396 has been formed in the metal outer shell 370. Inner shell 396 is preferably made of a polymer material and is formed by a rotational casting procedure. The inner shell 396 will become fused to the exposed surface of sleeve 380.

Figure 7:
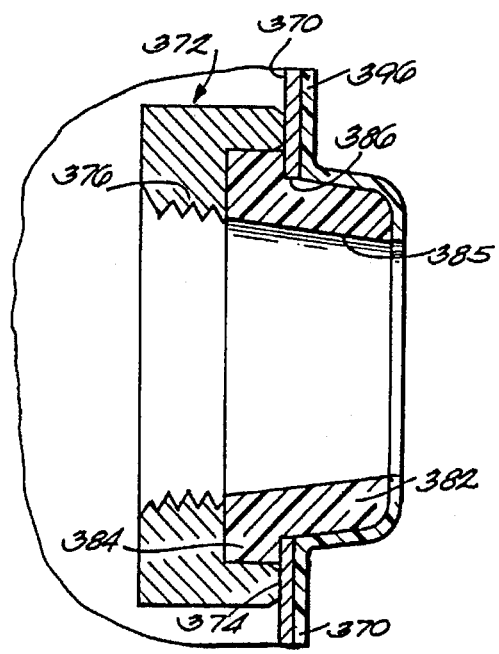
Figure 8:
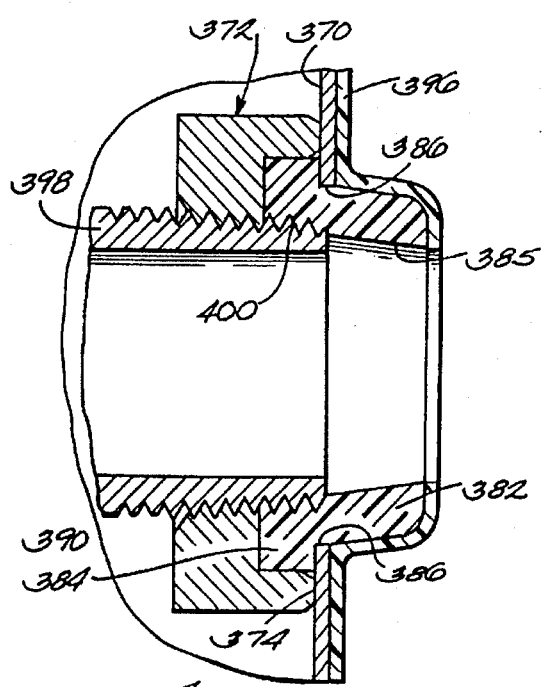
Figures 9, 10, 11:
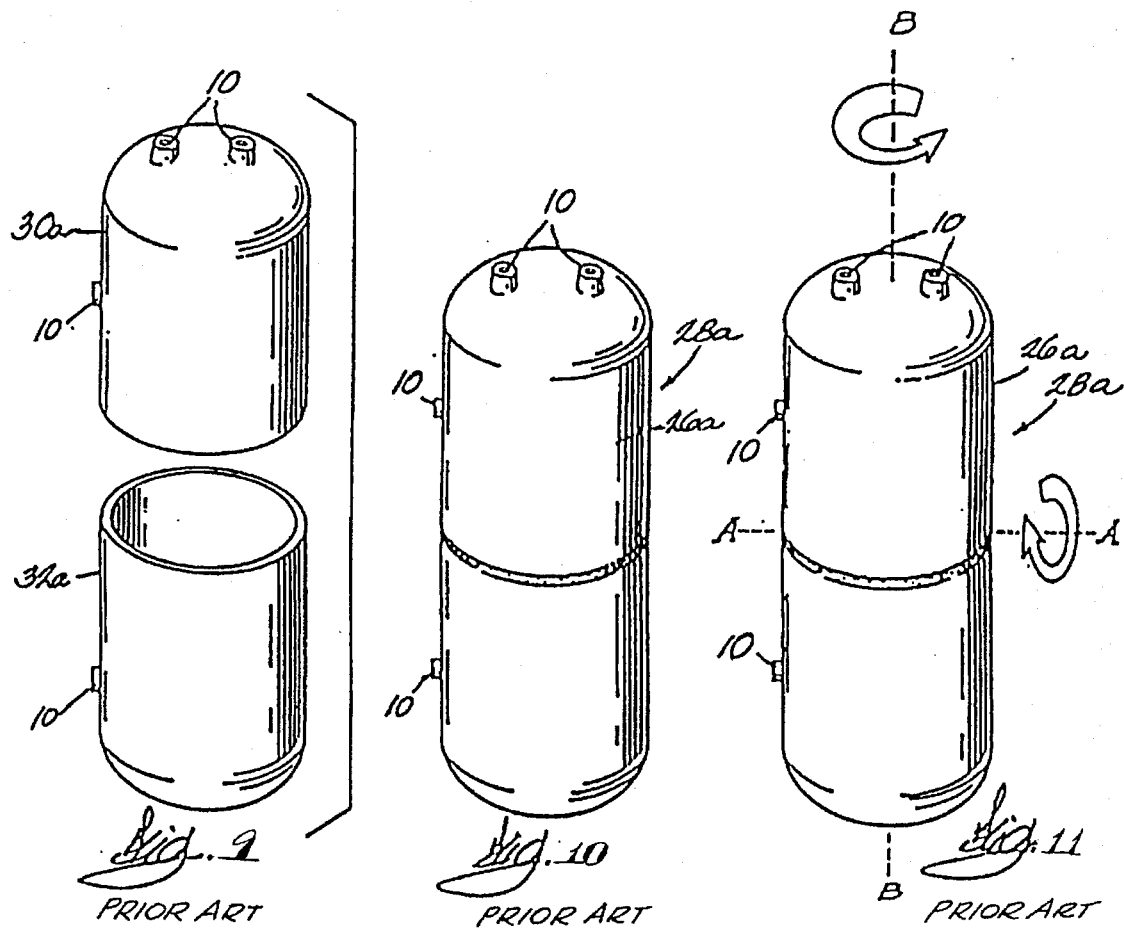
FIGS. 9, 10, 11, 12 and 13 correspond to FIGS. 2, 3, 4, 5, and 6 in U.S. Pat. No. 5,217,140.
Figure 13:
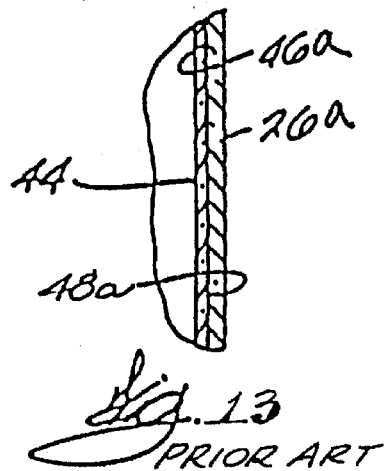
Figure 12:
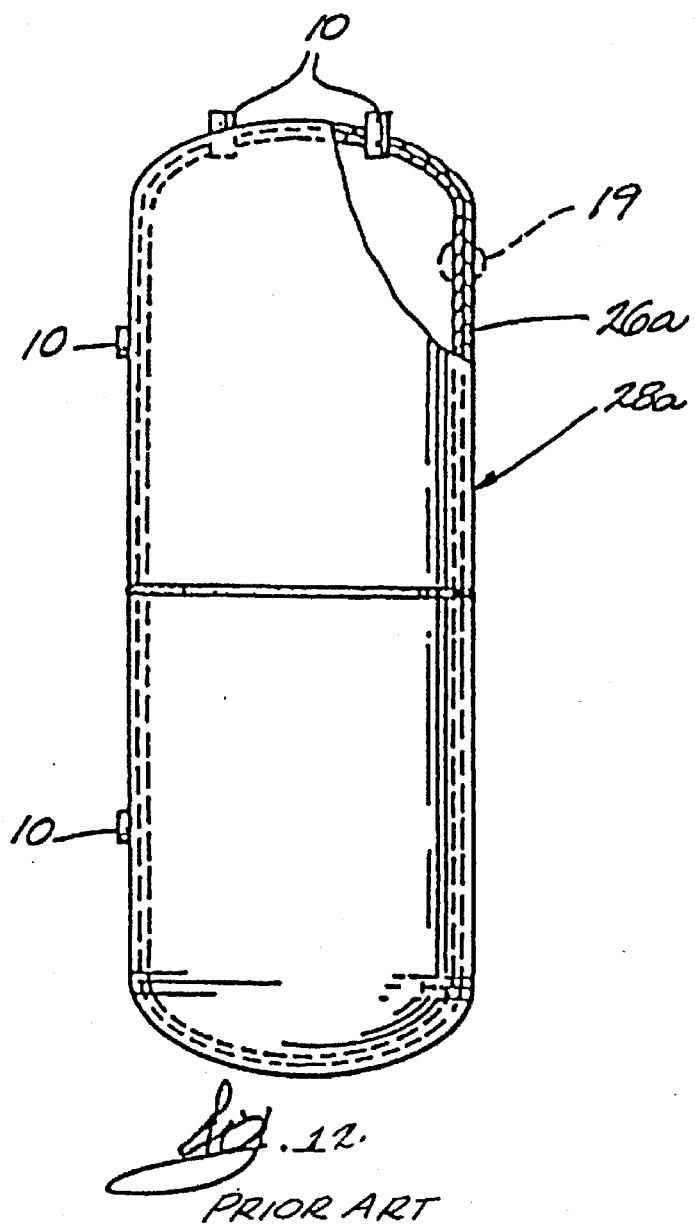

FIG. 8 shows the assembly of FIG. 7 with a threaded pipe nipple 398 installed in fitting 372. In a water heater tank, the threaded nipple 398 may be a part of a temperature and pressure relief valve or a part of a drain valve. It will be appreciated that as a threaded pipe nipple 398 is threaded into fitting 372, the lead threads 400 thereon will cut into the polymer material of tapered surface 385 of sleeve 380 to thereby cut a length of threads into surface 385 as shown in FIG. 8.

The present invention constitutes an improvement to the tank connection shown in FIGS. 5–8.

As explained hereinafter, an object of the present invention is to eliminate or at least reduce the likelihood of water leakage into contact with metal parts of the connector and/or the metal outer tank shell.

One embodiment of the present invention is described as follows. The description will be made in the form of an explanation of the method of fabrication of the tank connector and the tank in which the connector is mounted.

Referring to the drawings in detail, FIGS. 1, 2, 3 and 3a show one embodiment of a tank connector assembly identified by reference numeral 10.

The first step in the assembly of connector 10 is to assemble expandable band 12 and insert member 14. Insert member 14 is preferably of a polymer material and has a cylindrical shape comprised of an upper section 15 and a downwardly extending lower section 16. More specifically, member 14 is made of a cross-linkable material which is highly resistant to creep. A groove 13 is formed on the inner surface of upper section 15. Expandable band 12 and insert member 14 can be assembled to form a sub-assembly by simply sliding band 12 into the groove 13 in insert member 14.

The next step is to assemble the sub-assembly of band 12 and insert member 14 with a spud member 24.

Spud member 24 is made of metal (preferably steel) and is comprised of an internally threaded upper portion 26 and a cylindrical dependent wall portion 28 having a weld projection 30 formed at the end of the wall 28. The sub-assembly of parts 12 and 14 is forced upwardly into the space inside the spud member defined by depending wall portion 28.

The next step is to apply an expansion force to band 12 causing the band to deform slightly and thereby force upper section 15 of insert member 14 into tight sealing contact with the inner face 29 of depending wall portion 28 of spud member 24.

Expansion band 12 is made of a suitable metal or plastic material. The band 12 embodies certain characteristics, i.e., it must be capable of being forcefully expanded from a first diameter to a second slightly greater diameter. And it must rigidly maintain the second diameter after the expansion step.

In a preferred embodiment, expandable band 12 is made of a noble metal such as stainless steel, brass or copper. Expandable band 12 can also be made of a plastic material such as nylon having a low resistance to creep. The plastic ting may have a cut line (see reference numeral 50A in FIG. 4). The cut 50A permits the ring to separate at the cut line when expandable pressure is applied.

In the embodiment of the invention shown in FIGS. 3a, band 12 may have the following dimensions:

| Unexpanded | |
|---|---|
| Band I.D. | 1.200" |
| O.D. | 1.300" |
| Expanded | |
| Band I.D. | 1.300" |
| O.D. | 1.400" |
| Band Width | .250" |

Band 12 can be expanded by any suitable device or tool. One example is an expansion tool of conventional design wherein an actuating pin is actuated by a hydraulic cylinder to expand a multi-fingered assembly causing the fingers to contact and expand the expandable ring.

The final step in the assembly of connector 10 is to install a plug member 32 into the spud 24. Plug member 32 is preferably of a polymer material such as 15% glass filled fluoroplastics and is comprised of an externally threaded top portion 34 and a closed nose portion 36. Plug member 32 is threaded into spud member 24 to complete the connector assembly 10 as shown in FIG. 1. The upper interior 38 of plug member 32 is splined to facilitate its installation into and removal from spud member 24 by a suitable tool (not shown).

The next Step in the fabrication of a finished tank connector is to securely fasten the assembly 10 in the steel wall 11 of a tank. This is accomplished by positioning the assembly 10 in an opening 13 in the wall 11 of a tank and then welding the projection 30 on spud wall 28 to the surface of the tank wall as shown in FIG. 2. The welding step will cause welding projection ring 30 to be fused to tank wall 11 as indicated by reference numeral 15 in FIG. 2. With the spud 24 welded in place, the shoulder 21 on insert member 14 will fit snugly against the outer surface of tank wall 11.

After the required number of assemblies have been welded to the tank wall, the fabrication of the completed tank is accomplished as described as follows.

To summarize, as shown in FIGS. 2, 3, 4, 5 and 6 of U.S. Pat. No. 5,217,140 (corresponding to FIGS. 9, 10, 11, 12 and 13 herein), the outer shell 26a of the completed tank 28a is comprised of two parts; namely, an upper half member 30a and a lower half member 32a, each of which is formed by a deep drawing process.

After the required number of connector assemblies 10 are welded to the tank half members, the half members are fastened together in a secure manner to form a completed outer shell.

Preferably such fastening step is performed by laser welding.

After the completed outer shell is fabricated, an inner shell 44 of non-corrosive polymer material is formed inside the outer shell adjacent the internal surface of the outer shell. In one preferred embodiment, the non-corrosive polymer material is polybutelene. The polybutelene material is introduced into the outer shell in powder form. This can be accomplished before the two halves are welded together or the powder material can be introduced through an opening in the tank wall after the two halves are welded together.

After the outer shell is charged with a polymer material, it is then subjected to rotational casting operation while heat is applied to the outer shell. A suitable rotational casting operation is described in detail in U.S. Pat. No. 5,217,140. Such a rotational casting operation will cause the powder material to melt and be distributed uniformly over the internal surface of the outer shell to thereby form an inner shell 44.

Referring to FIG. 3 of the present invention, the material of the inner shell will cover the tank wall and each connector fitting as shown in FIG. 3. The portion of the inner shell 44 which comes in contact with portion 16 of insert member 14 will be bonded to such member. The polymer material of inner shell 44 will puddle up in the area of the bond as indicated by reference numeral 45 in FIG. 3.

After the formation of the inner shell 44, the plug members 32 will be removed by a suitable tool to produce a finished connector assembly as shown in FIG. 3a.

As indicated above, member 14 is made of a polymer material. The particular characteristics of the material of this member is important.

Referring to the material of insert 14, it is important that the tensile strength of the material be sufficiently great to prevent rupture at certain critical areas. A critical area is indicated by the dotted circle 23 on FIG. 2. The polymer material of member 14 must also be capable of providing a strong bond between the lower section 16 of member 14 and inner shell 44 in the area indicated by reference numeral 45 in FIG. 3.

Polymer materials suitable for use in making insert member 14 may be from the olefin family. More specifically, such materials can be polypropylene, polyethylene and polybutylene.

Typical plastics are either thermoplastic or thermoset i.e., thermoplastic: PP, PE, PB, etc.; thermoset: polyester, epoxy cross-linked polyethylene (XLPE)).

While a thermoplastic plastic connector can be used with the above type of connector, a further improvement to the invention is to use a cross linked polymer as the insert 14. (Cross linked polymers are different from thermoplastics (i.e., PP, PE, PB) in that the molecular chains that make up the polymer are all connected to one another, (in essence the molecules are one single macro molecule, not individual chains which are typical of thermoplastic).

This characteristic of XL polymers improves the mechanical/physical/environmental properties of the polymer. Additionally the polymer exhibits substantially reduced "creep" properties. "Creep" is the tendency of a polymer to change shape in response to stress and aging of the plastic. By using an XL polymer, the stress aging (creep) properties of the plastic connector are improved, thereby reducing the possibility that the new connector 10 will lose its "seal" over time.

Referring to the embodiment shown in FIGS. 1–3a, it will be appreciated that the expansion band 12 can be expanded either before or after the spud 24 and insert 14 are welded to the tank wall 11.

FIG. 4 shows a second embodiment of the present invention. Parts of the FIG. 4 embodiment which correspond to the parts of the FIGS. 1–3a embodiment are identified with the same reference numerals except that the reference numerals of FIG. 4 have a suffix A.

Referring to FIG. 4, the embodiment shown therein is for a tank connector assembly identified by reference numeral 10A.

The first step in the assembly of connector 10A is to pre-mold expansion band 12A into the insert member 14A. Insert member 14A is preferably of a polymer material and has a cylindrical shape comprised of an upper section 15A and a downwardly extending lower section 16A. A groove 13A is formed on the inner surface of upper section 15A.

The next step is to assemble the subassembly of band 12A and insert member 14A with a spud member 24A.

Spud member 24A is made of metal (preferably steel) and is comprised of an internally threaded upper portion 26A and a cylindrical dependent wall portion 28A. A weld projection 30A is formed at the end of the wall 28A. The subassembly of parts 12A and 14A is forced upwardly into the space inside the spud member defined by depending wall portion 28A.

The next step is to apply an expansion force to band 12A causing the band to deform slightly and thereby force upper section 15A of insert member 14A into tight sealing contact with the inner face 29A of depending wall portion 28A of spud member 24A.

Expansion band 12A is made of a suitable metal or plastic material. The band 12A embodies certain characteristics, i.e., it must be capable of being forcefully expanded from a first diameter to a second slightly greater diameter. It must also rigidly maintain the second diameter after the expansion step.

In the preferred embodiment, expandable band 12A is made of a noble metal such as stainless steel, brass or copper. Expandable band 12A can also be made of a plastic material such as nylon having a low resistance to creep. The plastic ring may have a cut line (see reference numeral 50A in FIG. 4). The cut 50A permits the ring to separate at the cut line when expandable pressure is applied. In the embodiment of the invention shown in FIG. 4, band 12A may have the following dimensions:

|  | Unexpanded |  |
| --- | --- | --- |
| Band I.D. |  | .930" |
| O.D. |  | 1.030" |
|  | Expanded |  |
| Band I.D. |  | 1.050" |
| O.D. |  | 1.150" |
| Band Width |  | .312" |

Band 12A can be expanded by any suitable device or tool. One example of a suitable expanding device is an expansion tool of conventional design wherein an actuating pin is actuated by a hydraulic cylinder to expand a multi-fingered assembly causing the fingers to contact and expand the expandable ring.

The next steps in the assembly of connector 10A are the same as that with regard to connector 10 as set forth above starting on page 5, line 1.

Polymer materials suitable for use in making insert member 14A are the same as set forth above with regard to insert member 14.

Finally, it should be noted that expansion band 12A can be expanded in groove 13A either before or after the spud 24A is welded to the tank wall.

The particular configuration of the connector assembly 10 described above is for connection of hot and cold water connections to the tank and for installation of a drain valve and a temperature/pressure vane to a water heater tank.

While the invention has, been herein shown and described in what is presently conceived to be the most practical and preferred embodiment, it will be obvious to one or ordinary skill in the art that modifications may be made thereof within the scope of the invention, which scope is not to be limited except by the appended claims.

I claim:

1. A method of fabricating a tank connector assembly for mounting in an opening in the wall of a tank, said tank connector assembly having been fabricated by the following steps:

(a) providing a metal spud member having an internally threaded portion and a cylindrical wall portion;

(b) producing a sub-assembly comprised of an insert member having an internal groove therein and made from a polymer material and an expandable band member positioned in said groove;

(c) assembling the sub-assembly of step (b) with the spud member of step (a), with the sub-assembly of step (b) positioned inside the cylindrical wall portion of said spud member; and (d) applying an expansion force to said expandable band causing said expandable band to deform slightly and thereby force said insert member into tight sealing contact with said depending wall portion of said spud member.

2. The method of fabricating a tank connector assembly according to claim 1 in which said expandable band and said insert member are assembled to form a sub-assembly by sliding said expandable band member into said groove in said insert member.

3. The method of fabricating a tank connector assembly according to claim 1 in which said expandable band is pre-molded into said groove in said insert member.

4. The method of fabricating a tank connector assembly according to claim 1 in which said insert member is made of a thermoplastic plastic material.

5. The method of fabricating a tank connector assembly according to claim 1 in which said insert member is made of a thermosetting plastic material.

6. The method of fabricating a tank connector assembly according to claim 1 in which said insert member is made of a cross-linked polymer material.

7. The method of fabricating a tank connector assembly according to claim 1 in which said expandable band is made of a noble-type metal material.

8. A method of fabricating a tank connector assembly for mounting on a tank having an outer shell of metal material and an inner shell of polymer material inside the outer shell, said tank connector assembly having been fabricated by the following steps:
 (e) providing a metal spud member having an internally threaded portion and a cylindrical wall portion;
 (f) producing a sub-assembly comprised of an insert member having an internal groove therein and made from a polymer material and an expandable band member positioned in said groove;
 (g) assembling the sub-assembly of step (b) with the spud member of step (a), with the sub-assembly of step (b) positioned inside the cylindrical wall portion of said spud member; and
 (h) applying an expansion force to said expandable band causing said expandable band to deform slightly and thereby force said insert member into tight sealing contact with said depending wall portion of said spud member.

9. The method of fabricating a tank connector assembly according to claim 8 in which said expandable band and said insert member are assembled to form a sub-assembly by sliding said expandable band member into said groove in said insert member.

10. The method of fabricating a tank connector assembly according to claim 8 in which said expandable band is pre-molded into said groove in said insert member.

11. A method of fabricating a tank and tank connector therefor comprising the steps of:
 (i) forming a pair of top and bottom members by a metal deformation procedure;
 (ii) welding at least one tank connector assembly in an opening in one of the members, said tank connector assembly having been fabricated by the following steps:
  (a) providing a metal spud member having an internally threaded portion and a cylindrical wall portion;
  (b) producing a sub-assembly comprised of an insert member having an internal groove therein and made from a polymer material and an expandable band member positioned in said groove;
  (c) assembling the sub-assembly of step (b) with the spud member of step (a), with the sub-assembly of step (b) positioned inside the cylindrical wall portion of said spud member;
  (d) applying an expansion force to said expandable band causing said expandable band to deform slightly and thereby force said insert member into tight sealing contact with said depending wall portion of said spud member;
 (iii) fastening the top and bottom members together by welding to form an outer shell having an internal surface;
 (iv) charging one half member of the outer shell with a polymer material before said welding step;
 (v) subjecting the tank to a rotational movement in the presence of heat to thus cause the polymer material of step (iv) to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

12. A method of fabricating a tank and tank connector therefor according to claim 11 in which said inner shell becomes bonded to said insert member during the performance of step (v).

13. A method of fabricating a tank and tank connector therefor comprising the steps of:
 (i) forming a pair of top and bottom members by a metal deformation procedure;
 (ii) welding at least one tank connector assembly in an opening in one of the members, said tank connector assembly having been fabricated by the following steps:
  (a) providing a metal spud member having an internally threaded portion and a cylindrical wall portion;
  (b) producing a sub-assembly comprised of an insert member having an internal groove therein and made from a polymer material and an expandable band member positioned in said groove;
  (c) assembling the sub-assembly of step (b) with the spud member of step (a), with the sub-assembly of step (b) positioned inside the cylindrical wall portion of said spud member;
  (d) applying an expansion force to said expandable band causing said expandable band to deform slightly and thereby force said insert member into tight sealing contact with said depending wall portion of said spud member;
 (iii) fastening the top and bottom members together by welding to form an outer shell having an internal surface;
 (iv) charging one half member of the outer shell with a polymer material after said welding step;
 (v) subjecting the tank to a rotational movement in the presence of heat to thus cause the polymer material of step (iv) to be uniformly distributed over the internal surface of the outer shell to thereby form an inner shell of non-corrosive material inside the outer shell wherein the inner shell provides a substantially leak-tight liner for the outer shell to thus prevent contact between the contents of the tank and the outer shell, said outer shell serving as a mold for the inner shell wherein said mold becomes a permanent part of the completed tank.

14. A method of fabricating a tank and tank connector therefor according to claim 13 in which said inner shell becomes bonded to said insert member during the performance of step (v).

* * * * *